US012758014B1

(12) United States Patent
Ardehali

(10) Patent No.: US 12,758,014 B1
(45) Date of Patent: Oct. 13, 2026

(54) WALL MOUNT ADAPTOR

(71) Applicant: Katayoon Ardehali, Sparta, NJ (US)

(72) Inventor: Katayoon Ardehali, Sparta, NJ (US)

(*) Notice: Subject to any disclaimer, the term of this patent is extended or adjusted under 35 U.S.C. 154(b) by 104 days.

(21) Appl. No.: 18/896,374

(22) Filed: Sep. 25, 2024

(51) Int. Cl.
*A47B 96/02* (2006.01)
*F16M 13/02* (2006.01)

(52) U.S. Cl.
CPC ............. *A47B 96/02* (2013.01); *F16M 13/02* (2013.01)

(58) Field of Classification Search
CPC ....... A47B 96/02; A47B 81/007; A47B 81/02; A47B 81/04; F16M 13/02
USPC ............. 248/218.1, 249; 211/75, 106, 88.01, 211/90.01, 90.04
See application file for complete search history.

(56) References Cited

U.S. PATENT DOCUMENTS 1,936,517 A * 11/1933 Maine .................. F25D 23/126 211/75
3,244,387 A * 4/1966 Hargraves .............. A45D 19/10 248/447.2
3,850,300 A * 11/1974 Young, Jr. ............... E05B 73/00 211/181.1
D315,840 S * 4/1991 Emery .......................... D6/525
5,356,061 A * 10/1994 Yu .......................... B60R 7/043 297/188.2
5,588,543 A * 12/1996 Finger ..................... A47F 5/083 211/90.01
5,876,009 A * 3/1999 Simoncioni, Jr. .. A47G 25/0614 248/339
6,386,379 B1 * 5/2002 Battaglia .................. A47F 5/01 49/70
6,464,086 B1 * 10/2002 Klein ........................ A47F 7/08 211/35
6,488,246 B2 * 12/2002 Song ..................... A47L 9/0009 248/302
D470,698 S * 2/2003 Cheng ............................ D6/525
6,520,351 B1 * 2/2003 Zadro .................... A47K 3/281 211/117
D473,411 S * 4/2003 Walker ........................... D6/525
D477,947 S * 8/2003 Snell ...................... A47K 3/281 D6/525
7,770,742 B1 * 8/2010 Wagner ................. A47K 3/281 211/113
7,931,161 B2 * 4/2011 Newbould ............. A47B 55/02 211/181.1
8,132,766 B2 * 3/2012 Tooley ................... A47K 10/18 248/205.5
8,186,521 B2 * 5/2012 Yu ............................ A47F 5/13 211/90.03
8,596,473 B2 * 12/2013 Newbould ........... A47B 96/067 211/88.01
8,636,156 B2 * 1/2014 Malik ................... A47B 57/04 211/90.03

(Continued)

*Primary Examiner* — Muhammad Ijaz
(74) *Attorney, Agent, or Firm* — Michael J. Feigin, Esq.; Feigin and Fridman LLC

(57) ABSTRACT

A wall mount adaptor of embodiments of the disclosed technology includes a wire loop with a plurality of front and back crossbars and a plurality of removably attachable shelves. Each shelf of the plurality of shelves may be removably attached by placing a curved portion of the shelf over a front crossbar, passing a back portion of the shelf between the front crossbar and a back crossbar (such as a back crossbar which corresponds to the front crossbar), and rotating the shelf such that the back portion thereof abuts the back crossbar.

14 Claims, 6 Drawing Sheets

(56) References Cited

U.S. PATENT DOCUMENTS

| | | | | | |
|---|---|---|---|---|---|
| 9,357,860 | B1 * | 6/2016 | Klowan | A47K 3/281 | |
| 9,770,138 | B2 * | 9/2017 | Engell | A47B 57/26 | |
| 10,064,523 | B2 * | 9/2018 | Engell | A47K 5/03 | |
| 11,266,275 | B1 * | 3/2022 | Ghiorghie | A47G 1/00 | |
| 11,877,653 | B1 * | 1/2024 | Ardehali | A47B 96/061 | |
| D1,048,760 | S * | 10/2024 | Ardehali | D6/553 | |
| 12,127,669 | B2 * | 10/2024 | Ardehali | A47B 96/061 | |
| 2004/0000528 | A1 * | 1/2004 | Nagel | A47F 1/126 | 211/59.3 |
| 2004/0188369 | A1 * | 9/2004 | Yu | A47K 5/04 | 211/106 |
| 2008/0053932 | A1 * | 3/2008 | Newbould | A47B 55/02 | 211/106.01 |
| 2010/0155350 | A1 * | 6/2010 | Kaplan | F16B 12/26 | 211/113 |
| 2011/0233156 | A1 * | 9/2011 | Rosen | D06F 79/02 | 211/26 |
| 2012/0091088 | A1 * | 4/2012 | Didehvar | A47K 3/281 | 211/90.04 |
| 2014/0124467 | A1 * | 5/2014 | Kwok | A47K 3/281 | 211/113 |
| 2023/0313511 | A1 * | 10/2023 | Chiang | B05B 15/62 | 211/119.009 |
| 2023/0337867 | A1 * | 10/2023 | Skrabis | A47K 3/281 | |

* cited by examiner

WALL MOUNT ADAPTOR

FIELD OF THE DISCLOSED TECHNOLOGY

The disclosed technology relates generally to wall mounts, and more specifically to adaptors for removably attaching shelves to walls.

BACKGROUND OF THE DISCLOSED TECHNOLOGY

For many, shelves are an indispensable element of home storage, allowing possessions to be neatly arranged and displayed without causing clutter. Occasionally, however, shelves are needed only temporarily, and at other times it is preferable to have a portion of the wall clear instead of having a shelving unit attached to it. There is therefore a need for a reliable shelf system which is easily assembled/disassembled and connected to/disconnected from a wall area.

SUMMARY OF THE DISCLOSED TECHNOLOGY

A wall mount adaptor of embodiments of the disclosed technology includes a wire loop with a left side, right side, top side, and bottom side, all of which are located within a middle plane. The adaptor further includes a plurality of front crossbars and a plurality of back crossbars. Each of the front crossbars is substantially on a first side of the middle plane, and each of the back crossbars is substantially on a second side of the middle plane, where the second side is opposite the first side. The first and second sides of the middle plane are parallel there-to. A "wire loop" is defined as a single wire formed into a structure such that the wire's first end is connected to the wire's second end.

Each of the front crossbars has a left end connected to the left side of the wire loop, and a right end connected to the right side of the wire loop. Additionally, each of the back crossbars has a right end connected to the right side of the wire loop, and a left end connected to the left side of the wire loop.

In embodiments, the wire loop is substantially rectangular in shape, with two opposite longer sides and two opposite shorter sides. The wire loop's left side and right side may be the two opposite longer sides, and may be substantially parallel and identical in length. The top side and bottom side may be the two opposite shorter sides. "Substantially rectangular in shape" is defined as having two opposite shorter sides and two opposite longer sides, connected to each other by bends, without limiting the sides to being linear, parallel, or identical to their opposite sides.

The wall mount adaptor further includes a plurality of substantially identical removable shelves. Each shelf includes a single back sheet and a single front sheet. The single front sheet may be rectangular, with two opposite longer sides and two opposite shorter sides, and may be connected at a first of the longer sides to a first side of the single back sheet. The single front sheet and the single back sheet are connected by way of an acutely angled bend. "Sheet" is defined as a single planar piece of material, such as a rigid material.

In embodiments, two corners of each single front sheet are bent inwards at an angle of between about 85-95 degrees relative to a planar side of said single front sheet and about 40-50 degrees relative to the middle plane.

In some embodiments, each front crossbar has a single corresponding back crossbar, and is positioned closer to the top side of the wire loop than the front crossbar's corresponding back crossbar. The distances between each pair of corresponding front and back crossbars may be substantially identical.

The back sheet of each shelf is sized such that when the shelf's angled bend abuts a front crossbar and the shelf's back sheet extends through the outer wire's middle plane, a portion of the shelf's back sheet abuts the front crossbar's corresponding back crossbar, with an extreme end of the shelf's back sheet extending there-below. Furthermore, when the shelf's angled bend abuts a front crossbar, the shelf's front sheet is angled away from the middle plane at an angle within a range of about 40-50 degrees. Additionally, when the shelf's angled bend abuts a front crossbar, a weight of the shelf's front sheet causes the shelf to rotate (about the front crossbar, which acts as a fulcrum point) until a portion of the shelf's back sheet abuts the front crossbar's corresponding back crossbar.

In embodiments, the wall mount adaptor further includes removable covers for at least one of the front crossbars and/or at least one of the back crossbars. The removably covers may include a hollow cylindrical protector with a portal extending along an elongated length thereof.

Each of the back crossbars may be spaced apart from the wire loop by way of a pair of identical linear wires, one connected to the back crossbar's left end and one connected to the back crossbar's right end.

In various embodiments, the wall mount adaptor includes a wall attachment piece which is removably mountable to the wire loop. The wall attachment piece includes a base piece, a top piece, and a suction piece. The top piece is removably attachable to a first face of the base piece, and the suction piece is removably attachable to a second and opposite face of the base piece. The base piece, with the suction piece removably attached to the base piece's second face, has a thickness substantially equal to or greater than a distance from the middle plane to a point on any of the back crossbars that is furthest there-from.

The wall attachment piece, in various embodiments, further includes an outer circular protrusion with a hollow center and portals cut therein. The portals are sized such that the wire loop extends through each of them. In embodiments, one of the portals is adapted for placement of a flange on the wire loop which is perpendicular to each of the front crossbars.

A method of using the wall attachment piece, in some embodiments, includes the following steps: removably attaching the suction piece to the base piece's second face; removably attaching the base piece to a substantially vertical surface; removably placing a portion of the top side of the wire loop within the portals in the base piece's first face; and removably attaching the top piece to the first face of base piece such that the wire loop is between the base and top pieces. When connected in this way, the connection between the base and top pieces around the wire loop is sufficient to hold the wire loop substantially immobile against a normal force due to gravity.

A further method of using the wall mount adaptor, in some embodiments, includes the following steps: placing an angled bend of a shelf on a front crossbar such that the shelf's back sheet passes behind the front crossbar and in front of the front crossbar's corresponding back crossbar; and rotating the first shelf such that the back sheet is substantially held in place from above by the back crossbar and the front sheet is at substantially a 45 degree angle relative to the middle plane.

An additional method of using the wall mount adaptor, in some embodiments, includes the following steps: rotating a shelf that is placed on a front crossbar there-about such that the shelf's back sheet is between the front crossbar and a corresponding back crossbar and is spaced-apart from the back crossbar; and removing the shelf from the wire loop.

Described differently, a kit of embodiments of the disclosed technology includes an outer wire loop with a plurality of parallel front crossbars attached at either end to a front side thereof and a plurality of parallel back crossbars attached at either end to a back side thereof, as well as a plurality of removable shelves. Each shelf includes a back section and a front section with a bend there-between. Each shelf's back section abuts one of the back crossbar and each shelf's bend abuts one of the front crossbar.

Each shelf, in embodiments, includes a plurality of stoppers on the shelf's front section, with each stopper bent toward a top section of the outer wire loop. The angle between the front section and each of the stoppers is substantially between a range of 85-95 degrees, and the angle of each shelf's bend is within a range of substantially 40-50 degrees.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

A wall mount adaptor of embodiments of the disclosed technology includes a wire loop with a plurality of front and back crossbars and a plurality of removably attachable shelves. Each shelf of the plurality of shelves may be removably attached by placing a curved portion of the shelf over a front crossbar, passing a back portion of the shelf between the front crossbar and a back crossbar (such as a back crossbar which corresponds to the front crossbar), and rotating the shelf such that the back portion thereof abuts the back crossbar.

Embodiments of the disclosed technology will become more clear in view of the following discussion of the figures.

Figure 2:
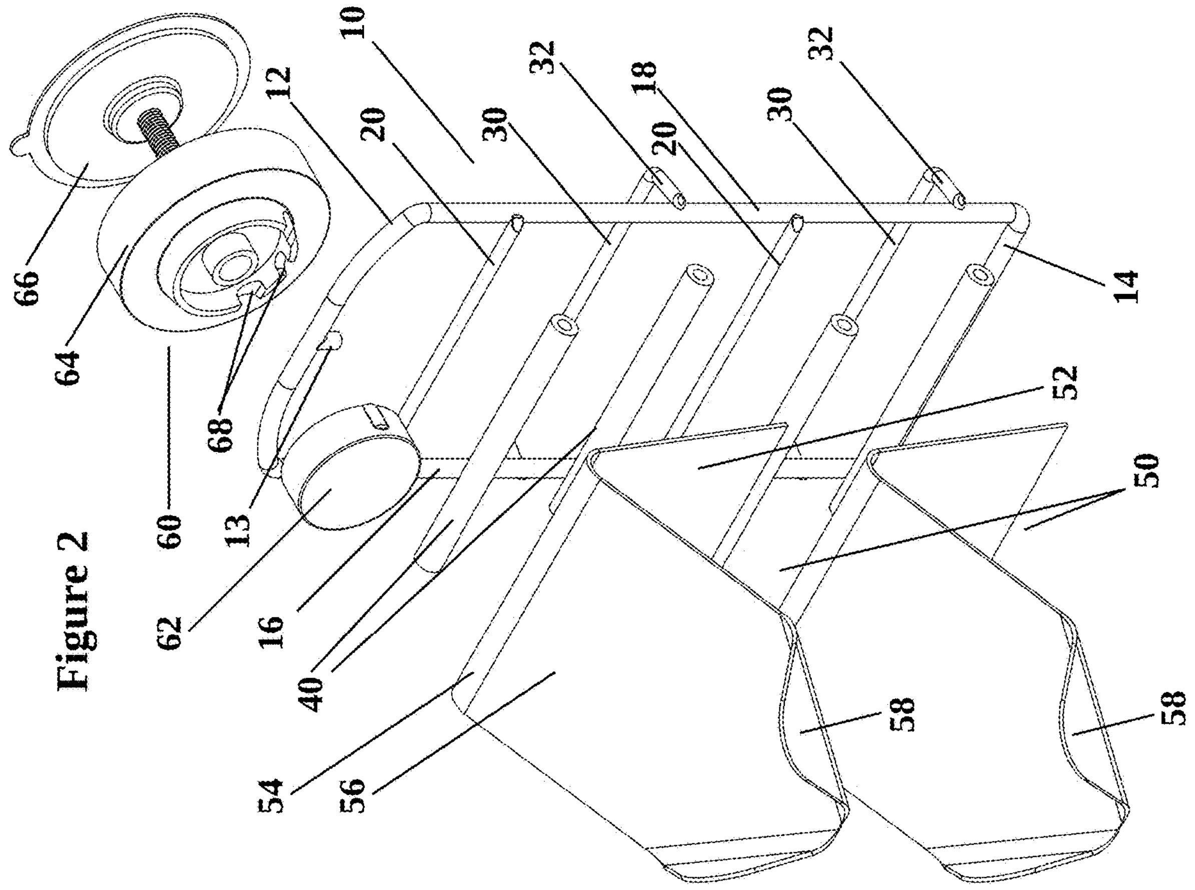
FIG. 2 shows an exploded top and right perspective view thereof.
Figure 1:
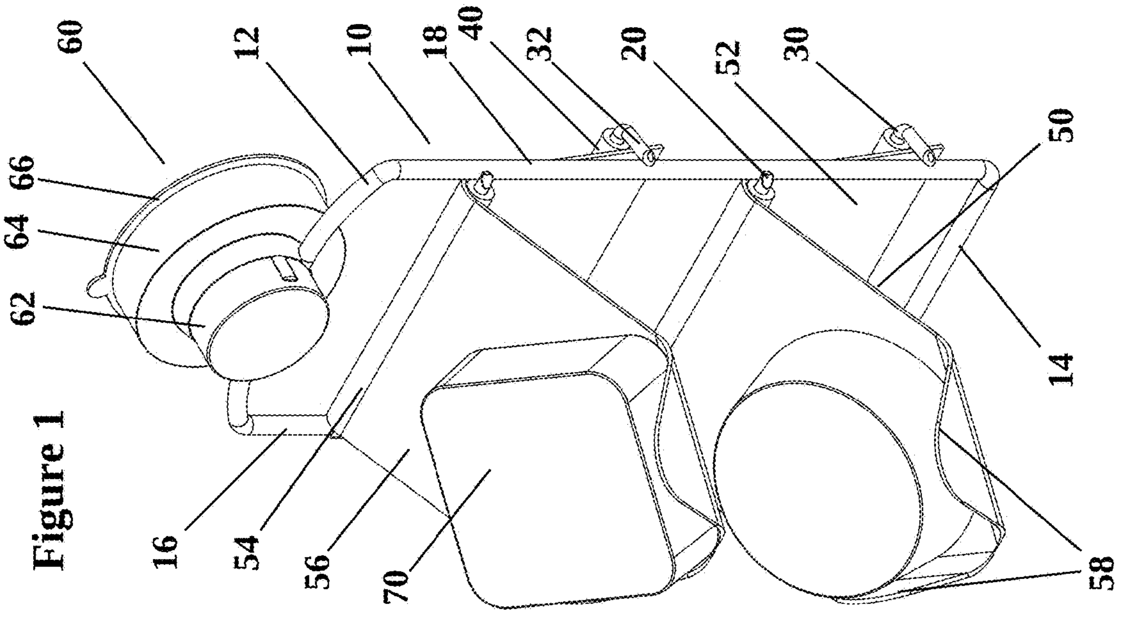
FIG. 1 shows a top and right perspective view of a wall mount adaptor of embodiments of the disclosed technology.

FIG. 1 shows a top and right perspective view of a wall mount adaptor of embodiments of the disclosed technology. FIG. 2 shows an exploded top and right perspective view thereof. The wall mount adaptor includes an outer wire 10, which, in the embodiment shown, is in a substantially rectangular shape.

The outer wire 10 has a plurality of front crossbars 20 and a plurality of back crossbars 30 attached thereto. The outer wire 10 includes a top side 12 which is closer to a top side of the outer wire 10 than any of the front crossbars 20 or back crossbars 30. The outer wire 10 surrounds a middle plane, and in the embodiment shown, substantially an entirety of the outer wire 10 lies within the middle plane.

The wall mount adaptor includes a top removable attachment 60 for removably connecting the wall mount to a surface, such as a wall. In the embodiment shown, the removable attachment 60 includes a cover 62, a base 64, and a suction cup 66, with the cover 62 being removably attachable at a front side of the base 64 and the suction cup 66 being removably attachable at a back side of the base 64. Furthermore, in the embodiment shown, the cover 62 and the suction cup 66 are removably attachable to each other via the base 64, such that the base 64 is placed between the cover 62 and the suction cup 66 which they are removably attached to each other, without either the cover 62 or the suction cup 66 being attached to base 64 directly.

In the embodiment shown, the base 64 further includes cutouts 68 configured to allow portions of the outer wire 10 to pass there-through. The cutouts 68, the base 64, and the cover 62 are sized such that when the outer wire 10 is removably placed within the cutouts 68 and the cover 62 is removably attached to the suction cup 66 via the base 64, the combination of the entire top attachment 60 is sufficient to hold the outer wire 10 substantially immobile against at least a force due to gravity. In various embodiments, the base 64 may be of any form so long as it is sufficient to removably attach to the outer wire 10 and to hold the outer wire 10 substantially immobile against at least a force due to gravity.

In the embodiment shown, the base 64 includes three cutouts 68. Two of the cutouts 68 are sized and positioned to hold portions of the top side 12 of the outer loop 10. A third cutout 68 is sized and positioned to hold a stabilizing flange 13 of the outer loop 10. The stabilizing flange 13 of the outer lop 10 is sized and positioned such that when the outer wire 10 is removably placed within the cutouts 68 and the cover 62 is removably attached to the suction cup 66 via the base 64, the normal force between the stabilizing flange 13 and the cutout 68 in which it is located is sufficient to prevent the outer wire 10 rotating within the middle plane about a point within the middle plane. In various embodiments, the stabilizing flange 13 may be of any number of flanges, in any configuration, of any size, and at any location on the outer loop 10 such that, when the outer wire 10 is removably placed within the cutouts 68 and the cover 62 is removably attached to the suction cup 66 via the base 64, the stabilizing flange 13 is sufficient to prevent the outer wire 10 rotating within the middle plane about a point within the middle plane.

The front crossbars 20 and the back crossbars 30, in the embodiment shown, include a plurality of attachments 40. These attachments 40 may be removable, and may include a portal for removability, such as a portal extending along a most elongated length thereof. In various embodiments, the attachments 40 may be deformable or rigid, and may be removably attachable to the crossbars 20, 30 by way of deforming the attachments 40, by way of hinges, or by any other means. The attachments 40 can be a silicone sleeve and can be reversibly deformable to temporarily deform and attach around a crossbar. Further, such an attachment 40 can prevent noise due to metal on metal contact of the parts of the wall mount adaptor.

In various embodiments, the attachments 40 are connected to the bends 54 and/or portions of the back sheets 52 of the shelves 50, such that an attachment 40 is connected to each shelf 50 at locations thereof configured to abut the crossbars 20, 30. The attachments 40 may include cylindrical attachments, such as with portas thereof configured to attach to the crossbars 20, 30, or may include linings of a same material as the attachments 40. The attachments 40 may be removably attachable to the shelves 50.

The wall adaptor includes a plurality of shelves 50. Each shelf 50 includes a back sheet 52 and a front sheet 56, with an acute bent connection 54 there-between. The connection 54 is at a first side of the back sheet 52 and at a first side of the front sheet 56. The front sheet 56, in the embodiment shown, has stoppers 58 at a second side thereof, where the second side is opposite the first side. The stoppers 58, in the embodiment shown, are bent upward toward the front sheet 56 at an angle between substantially 85-95 degrees. In various embodiments, the stoppers 58 may be of any shape, may be in any number, and may be in any location such that when the shelves are placed on the crossbars as shown in the figures, the stoppers are sufficient to prevent objects 70 placed on the shelves 50 from falling off the shelves 50 at least against the normal force due to gravity.

Figures 3, 4, 5, 6:
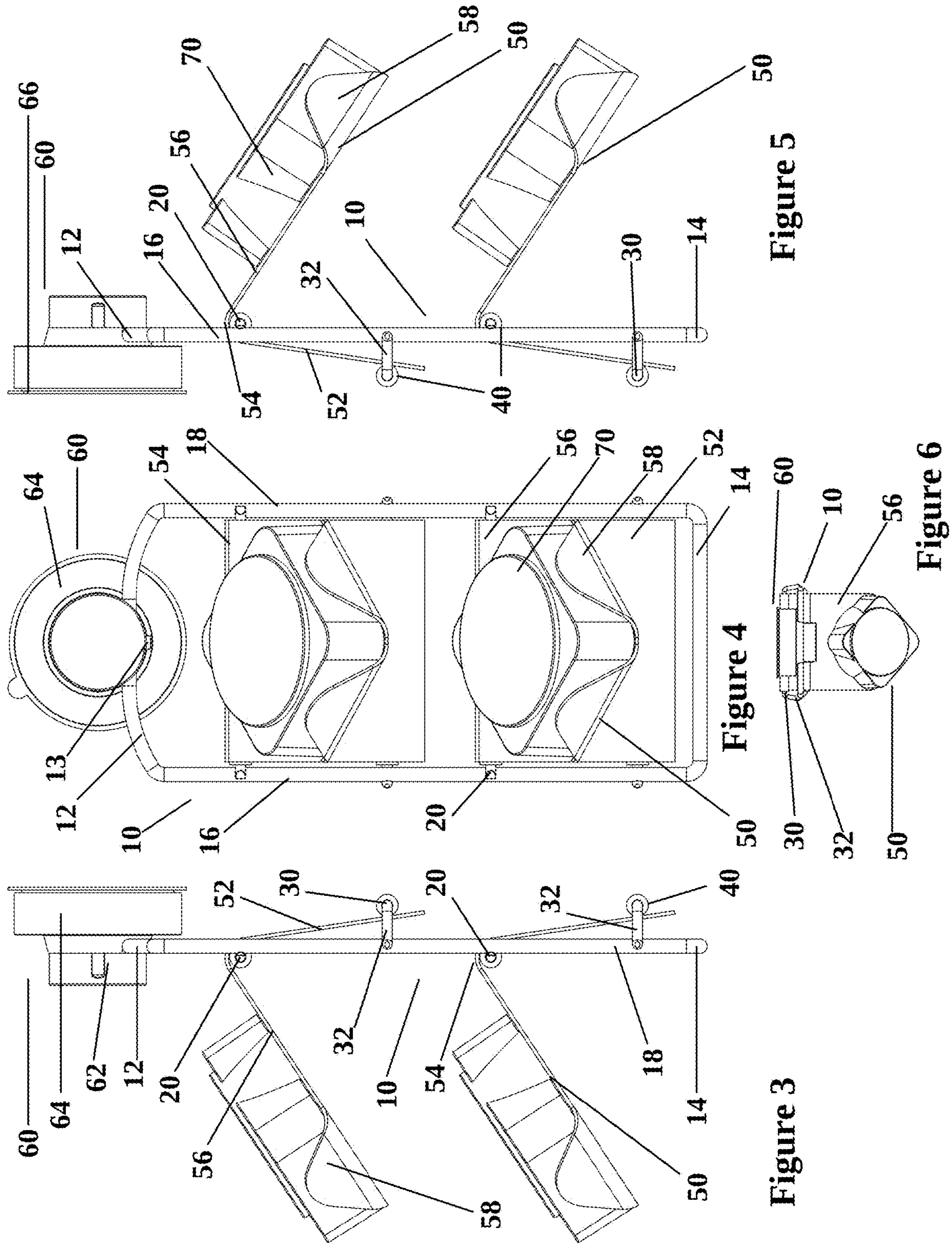
FIG. 3 shows a right side elevation view thereof.
FIG. 4 shows a front elevation view thereof.
FIG. 5 shows a left side elevation view thereof.
FIG. 6 shows a top plan view thereof.

FIG. 3 shows a right side elevation view thereof. FIG. 4 shows a front elevation view thereof. FIG. 5 shows a left side elevation view thereof. FIG. 6 shows a top plan view thereof. In the embodiment shown, the shelves 50 are removably attached to the outer loop 10 by way of placement about the crossbars 20, 30. Specifically, the shelf 50's bend 54 rests atop one of the front crossbars 20, such that the shelf 50's front sheet 56 is in front of the front crossbar 20 and the shelf 50's back sheet 52 passes between the outer loop 10's middle plane and extends in front of and below a corresponding back crossbar 30. Thus, when the shelf 50 is placed in this way, the shelf 50's front sheet 56 is substantially at a 40-50 degree angle relative to the outer loop 10's middle plane and the shelf 50's back sheet 56 is substantially at a 10-20 degree angle relative to the outer loop 10's middle plane. In this way, a weight of an object 70 that is placed on the front sheet 56 of the shelf 50, as well as a weight of the front sheet 56 of the shelf 50, is sufficient to cause the shelf 50 to rotate about a fulcrum point of the front crossbar 20, and a normal force between the shelf 50's back sheet 52 and the back crossbar 30 is sufficient to prevent the shelf 50 from rotating substantially past the configuration shown in the figures.

Figures 7, 8, 9, 10:
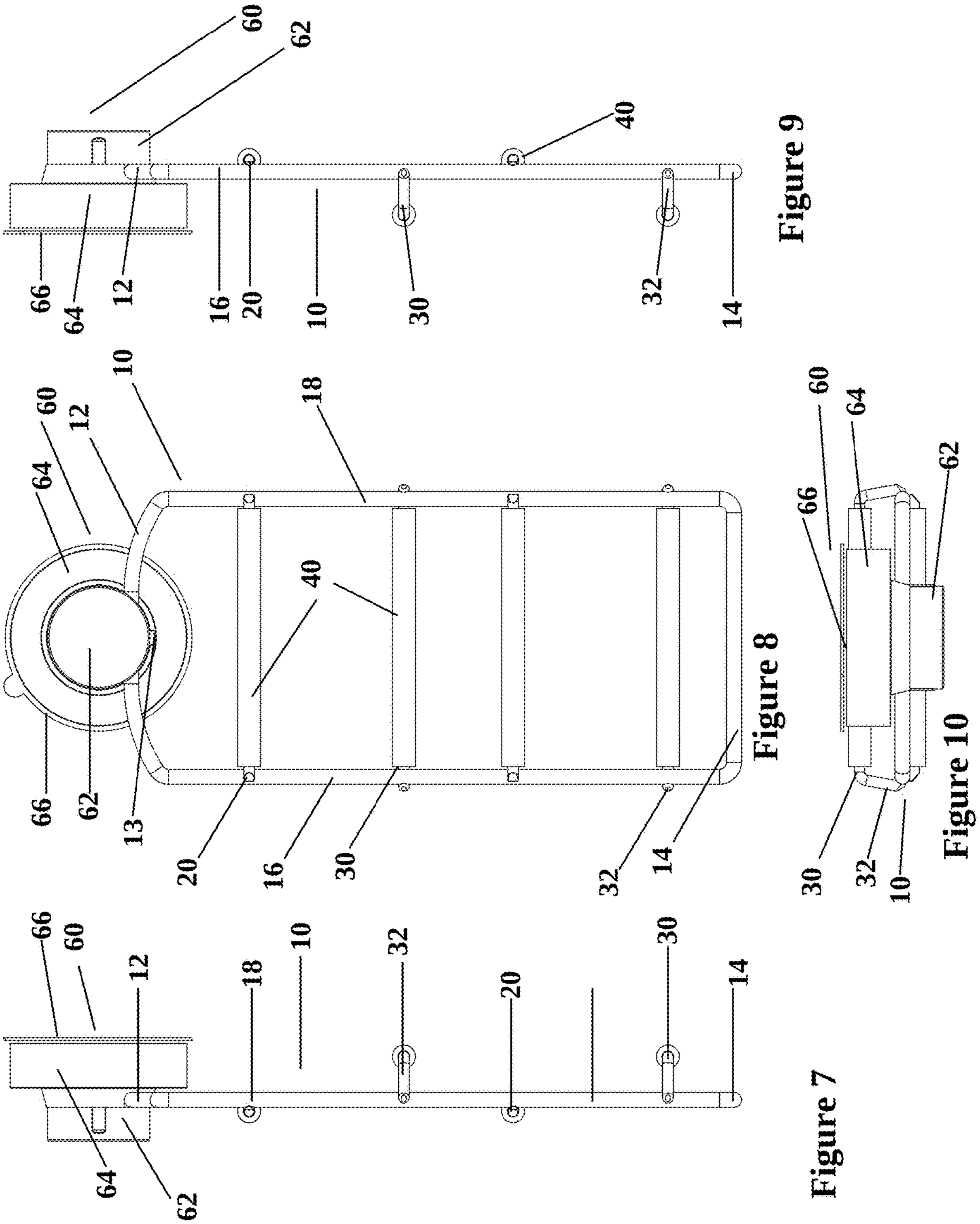
FIG. 7 shows a right side elevation view thereof with shelves removed.
FIG. 8 shows a front elevation view thereof with shelves removed.
FIG. 9 shows a left side elevation view thereof with shelves removed.
FIG. 10 shows a top plan view thereof with shelves removed.

FIG. 7 shows a right side elevation view thereof with shelves removed. FIG. 8 shows a front elevation view thereof with shelves removed. FIG. 9 shows a left side elevation view thereof with shelves removed. FIG. 10 shows a top plan view thereof with shelves removed.

The outer wire 10 has a plurality of front crossbars 20 and a plurality of back crossbars 30 attached thereto. Each of the front crossbars 20 is attached at a right end thereof to a right side 18 of the outer wire 10 and at a left side thereof to a left side 16 of the outer wire 10. Each of the back crossbars is attached at a right end thereof to a first end of a right connecting piece 32 and at a left end thereof to a first end of a left connecting piece 32. The right connecting piece 32 is attached at a second end thereof to the right side 18 of the outer wire 10, and the left connecting piece 32 is attached at a second end thereof the the left side 16 of the outer wire 10.

In the embodiment shown, each of the connecting pieces 32 are substantially identical in size, shape, and length. In other embodiments, the connecting pieces 32 may vary in size, shape, or length, such that distances between the outer wire 10 and each of the back crossbars 30 may vary.

The outer wire 10, in the embodiment shown, is substantially planar (i.e., an entirety thereof lies in substantially a single plane) and surrounds the middle plane. Each front crossbar 20 of the plurality of front crossbars lies within a front plane which is adjacent to the middle plane. Each back crossbar 30 of the plurality of back crossbars lies within a back plane with is on a side of the middle plane opposite a side of the front plane. In the embodiment shown, each of the front plane, middle plane, and back plane is parallel with respect to each other.

In other embodiments, the outer wire 10 may be any shape, so long as the plurality of front crossbars 20 are connected at either end there-to and are on a front side thereof and the plurality of back crossbars 30 at connected at either end there-to and are on a back side thereof, with a back side being opposite a front side.

The crossbars 20, 30, in the embodiment shown, are arranged along the outer wire 10 such that each front crossbar 20 has a corresponding back crossbar 30 which is located there-below, and each back crossbar 30 has a corresponding front crossbar 20 which is located there-above. In the embodiment shown, a distance between each pair of corresponding front crossbars 20 and back crossbars 30 is substantially identical, and a distance between each back crossbar 30 of a pair of corresponding front crossbars 20 and back crossbars 30 and a front crossbar 20 of a second pair of corresponding front crossbars 20 and back crossbars 30 located directly there-below is substantially identical. Furthermore, in the embodiment shown, a distance between each front crossbar 20 and a back crossbar 30 located there-above is closer than a distance between that front crossbar 20 and its corresponding lower back crossbar 30. In other embodiments, each front crossbar 20 may correspond to more than one back crossbar 30, or to none of the back crossbars 30, and each back crossbar 30 may correspond to more than one front crossbar 20, or to none of the front crossbars 20. Additionally, in other embodiments, distances between corresponding front crossbars 20 and back crossbars 30 corresponding there-to may vary, as may distances between pairs of corresponding front crossbars 20 and back crossbars 30.

In the embodiment shown, a combination of the base 64 and the suction piece 66 of the top attachment 60 has a width, measured from the front face of the base 64 to a face of the suction piece 66 opposite there-to, that is at least equal to a horizontal distance from a front face of the middle plane to a back face of the combination of a back crossbar 30 with a crossbar cover 40 removably attached there-to. In various embodiments, the base piece 64 and the suction piece 66 of the top attachment may be of any shape or size so long as a combination of the base 64 and the suction piece 66 of the top attachment 60 has a width that is at least equal to a horizontal distance from a front face of the middle plane to a back face of the combination of a farthest-back back crossbar 30 with a crossbar cover 40 removably attached there-to.

Figure 13:
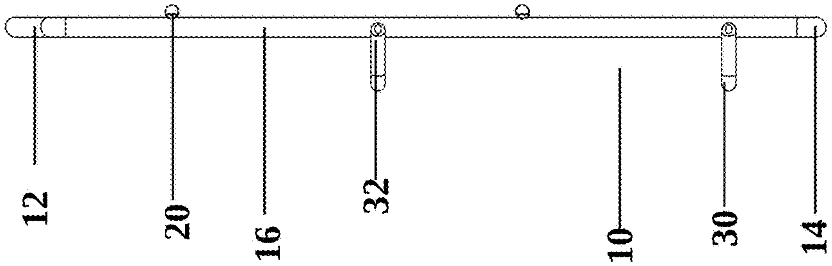
FIG. 13 shows a left side elevation view thereof with shelves, top connector, and crossbar covers removed.
Figure 12:
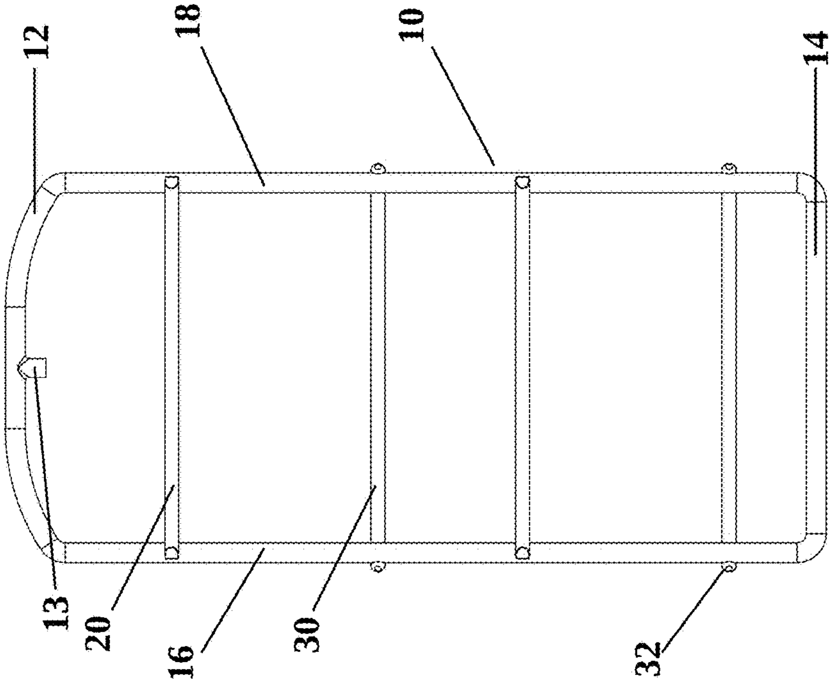
FIG. 12 shows a front elevation view thereof with shelves, top connector, and crossbar covers removed.
Figure 14:
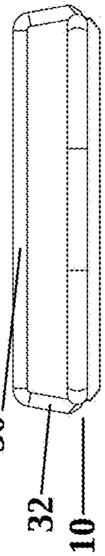
FIG. 14 shows a top plan view thereof with shelves, top connector, and crossbar covers removed.
Figure 11:
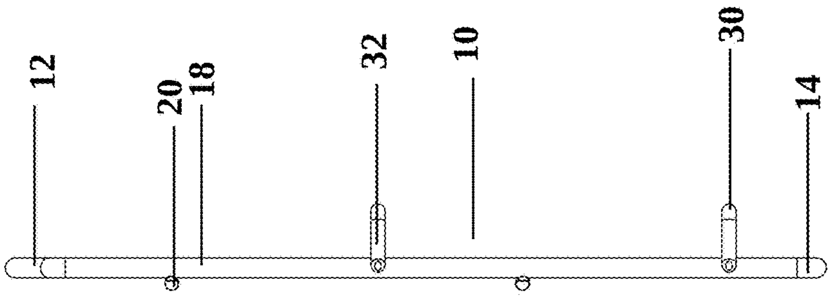
FIG. 11 shows a right side elevation view thereof with shelves, top connector, and crossbar covers removed.

FIG. 11 shows a right side elevation view thereof with shelves, top connector, and crossbar covers removed. FIG. 12 shows a front elevation view thereof with shelves, top connector, and crossbar covers removed. FIG. 13 shows a left side elevation view thereof with shelves, top connector, and crossbar covers removed. FIG. 14 shows a top plan view thereof with shelves, top connector, and crossbar covers removed. In the embodiment shown, the outer wire 10 has a substantially uniform width throughout, and each of the crossbars 20, 30 have substantially identical widths, where the width of the outer wire 10 is greater than the width of the crossbars 20, 30. In other embodiments, these widths may vary.

The outer wire 10, in the embodiment shown, includes a stabilizing flange 13. In this embodiment, the stabilizing flange 13 is substantially linear, is attached to the top side 12 of the outer wire 10, and is perpendicular to each of the crossbars 20, 30. In other embodiments, the shape, size, location, spatial orientation, and number of stabilizing flanges 13 may vary so long as when the top attachment 60 is removably attached to the outer wire 10, the connection of the stabilizing flange or flanges 13 there-to prevents rotation of the outer wire 10 within the middle plane about a point within the middle plane.

Figure 16:
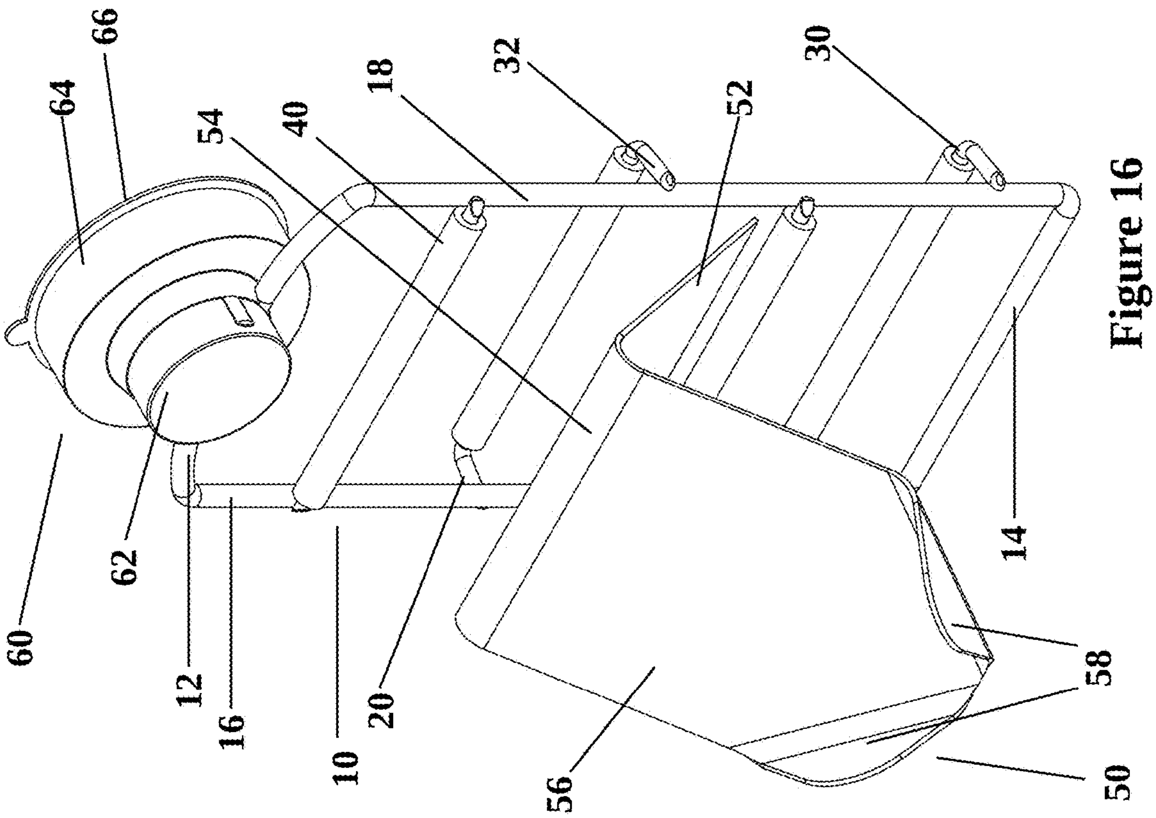
FIG. 16 shows a top and right perspective view thereof with one shelf removed and one shelf unattached.
Figure 15:
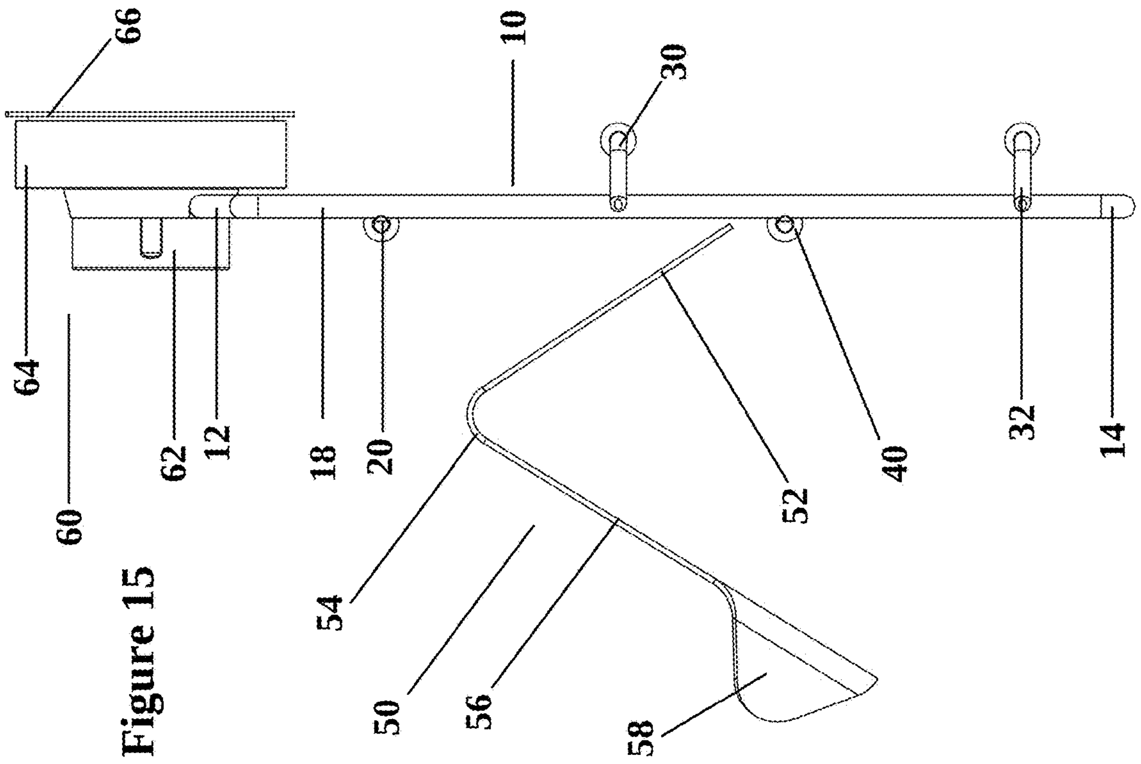
FIG. 15 shows a right side elevation view thereof with one shelf removed and one shelf unattached.
Figure 18:
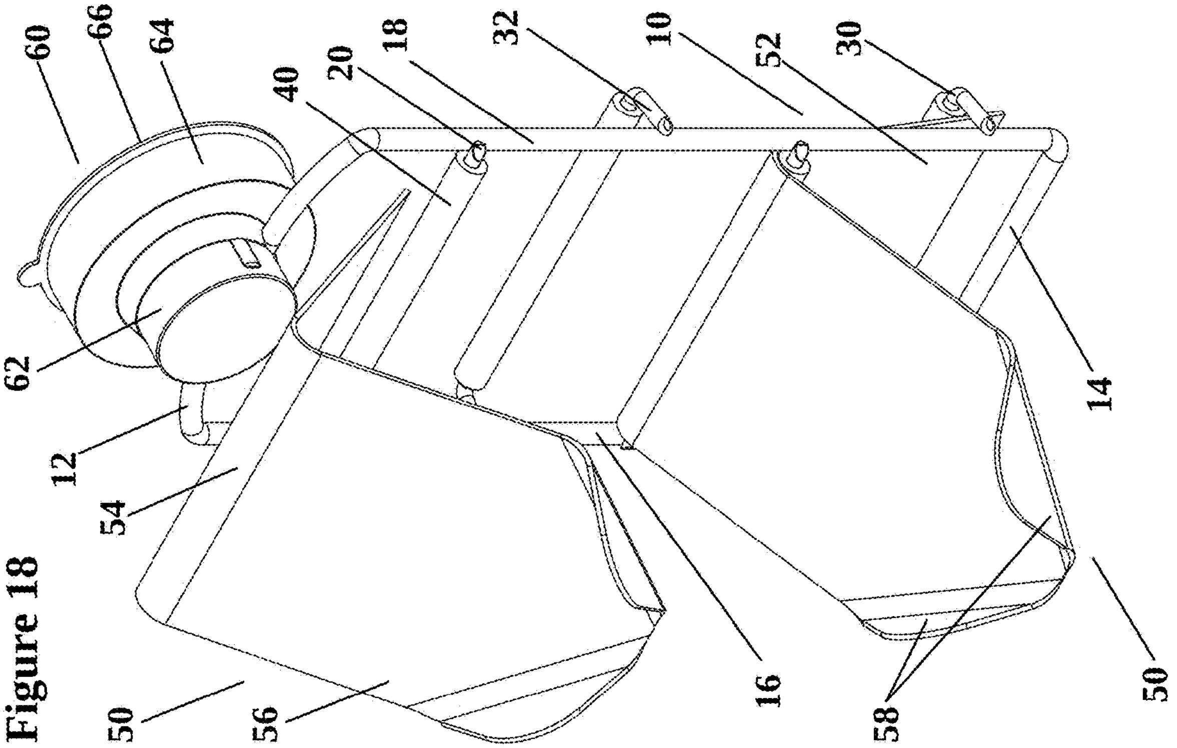
FIG. 18 shows a top and right perspective view thereof with one shelf attached and one shelf unattached.
Figure 17:
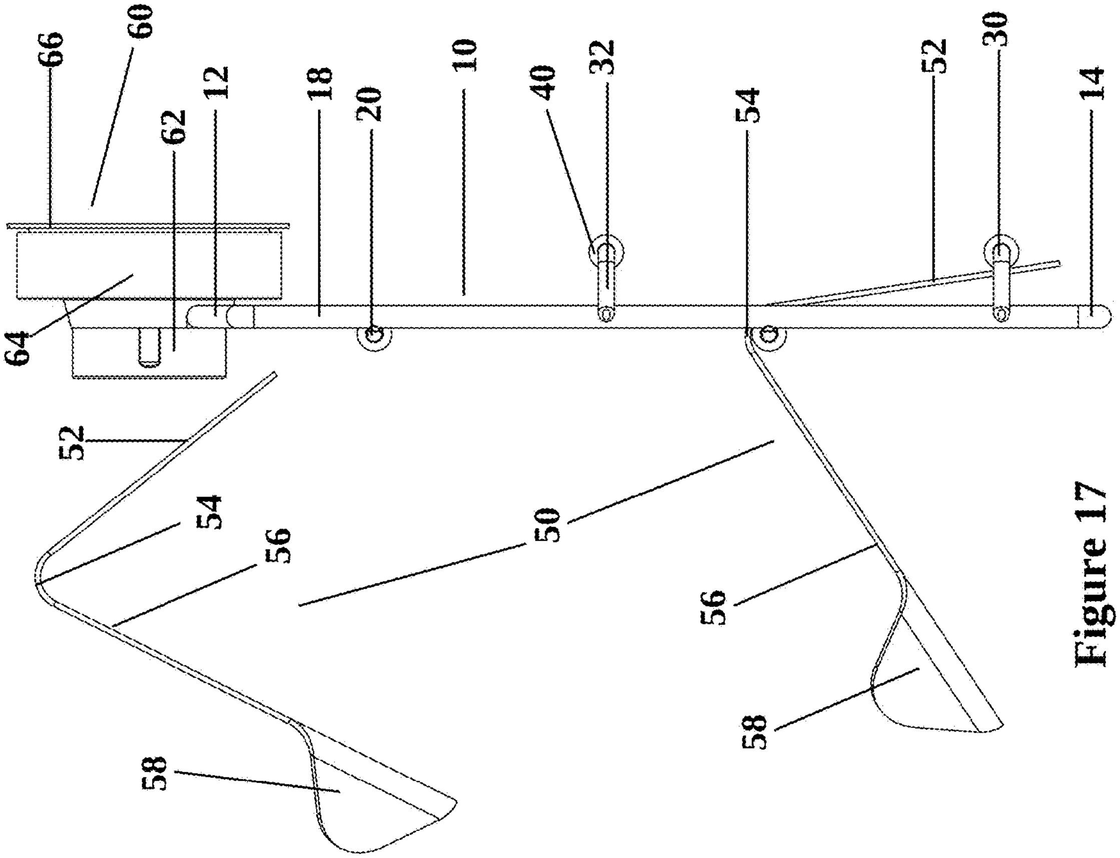
FIG. 17 shows a right side elevation view thereof with one shelf attached and one shelf unattached.

FIG. 15 shows a right side elevation view thereof with one shelf removed and one shelf unattached. FIG. 16 shows a top and right perspective view thereof with one shelf removed and one shelf unattached. FIG. 17 shows a right side elevation view thereof with one shelf attached and one shelf unattached. FIG. 18 shows a top and right perspective view thereof with one shelf attached and one shelf unattached. In the embodiment shown, each of the shelves 50 is substantially identical in shape to all other shelves 50. Furthermore, in the embodiment shown, each of the shelves is removably attachable to each of the fairs of corresponding front crossbars 20 and back crossbars 30.

In various embodiments, some or all of the shelves 50 may vary in size or shape, such that some of the shelves 50 fit better on some pairs of corresponding crossbars 20, 30 than on other pairs, or only fit on some of the pairs of corresponding crossbars 20, 30. In further embodiments, two or more of the shelves 50 may have identical back sheets 52 and bends 54 but may vary in the sizes and shapes of their front sheets 56 or of their stoppers 58, such that the two or more shelves 50 are substantially interchangeable. In some embodiments, elements of one or more of the shelves 50, or an entirety thereof, are manually reversibly moldable between two or more different positions. Each of the shelves 50 may be of any size or shape so long as each shelf 50 may be removably placed on a pair of corresponding crossbars 20, 30 such that the shelf 50's bend 54 abuts the front crossbar 20 from above and a portion of the shelf 50's back sheet 52 abuts the corresponding back crossbar 30 from in front and below. In some embodiments, two or more of the shelves 50 may be stackable, such that when the stacked shelves are removably placed on a pair of corresponding crossbars 20, 30, the bottom shelf 50's bend 54 abuts the front crossbar 20 and a portion of either the top shelf 50's or the shelf 50 with the farthest-extending back sheet 52's back sheet 52 abuts the corresponding back crossbar 30 from in front and below.

In embodiments, the crossbars 20, 30 may be movable along the right and left sides 16, 18 of the outer wire 10, either independently or in corresponding pairs of front crossbars 20 and back crossbars 30, such that a distance between each front crossbar 20 and its corresponding back crossbar 30 and/or a distance between each respective pair of corresponding front and back crossbars 20, 30 is variable. In embodiments in which the right and left sides 16, 18 of the outer wire 10 are not parallel to each other, some or all of the front crossbars 20 and/or back crossbars 30 may be extendable or collapsible along a longest extend thereof, such as by a telescoping mechanism.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A wall mount adaptor comprising:

a wire loop having a left side, right side, top side, and bottom side, all within a middle plane;

a plurality of front crossbars substantially on a first side of said middle plane, wherein each of said plurality of said front crossbars has a left end and right end, said left end connected to said left side of said wire loop and side right end connected to said right side of said wire loop;

a plurality of back crossbars substantially on a second side of said middle plane, said second side being parallel to, and an opposite side of said first side of said middle plane, wherein each of said plurality of said back crossbars has a left end and right end, said left end connected to said left side of said wire loop and said right end connected to said right side of said wire loop; and a plurality of substantially identical removable shelves, each said shelf comprising:

a single back sheet; and a single front sheet in a shape of a rectangle with two opposite longer sides and two opposite shorter sides, connected at a first longer side thereof to a first side of said single back sheet;

wherein said single front sheet and said single back sheet are connected by way of an acutely angled bend wherein each said front crossbar of said plurality of front crossbars has a single corresponding back crossbar of said plurality of back crossbars;

wherein each front crossbar is positioned closer to said top side of said wire loop than its said corresponding back crossbar; and wherein a distance between each said front crossbar and corresponding back crossbar is substantially identical.

2. The wall mount adaptor of claim 1, wherein said wire loop comprises a substantially rectangular shape with two opposite longer sides and two opposite shorter sides;

wherein said left side and said right side comprise said two opposite longer sides and are substantially parallel and identical in length; and wherein said top side and said bottom side comprise said two opposite shorter sides.

3. The wall mount adaptor of claim 1, wherein two corners of each said single front sheet of each said shelf of said plurality of shelves are bent inwards at an angle of between about 85-95 degrees relative to a planar side of said single front sheet.

4. The wall mount adaptor of claim 1, wherein each said back sheet of each said shelf is sized such that said angled bend abuts a front crossbar of said plurality of front crossbars, said back sheet extends through said middle plane, a portion of said single back sheet abuts a back crossbar corresponding to said front crossbar, and an extreme second end of said single back sheet extends below said back crossbar corresponding to said front crossbar.

5. The wall mount adaptor of claim 4, wherein when said angled bend abuts a front crossbar of said plurality of front crossbars, said front sheet of said shelf is angled away from said middle plane at an angle within a range of about 40-50 degrees.

6. The wall mount adaptor of claim 1, wherein said angled bend is configured to permit the rotation of said shelves by the weight of said front sheet about a fulcrum point comprising said front crossbar, until a portion of said back sheet thereof abuts said corresponding back crossbar.

7. The wall mount adaptor of claim 1, further comprising a removable cover on at least one of said front crossbars and at least one of said back crossbars, said removable cover further comprising a portal extending along an elongated length thereof.

8. The wall mount adaptor of claim 1, wherein each of said back crossbars is spaced-apart from said wire loop by way of a pair of identical linear wires, a first of said linear wires connected to a left side thereof and a second of said linear wires connected to a right side thereof.

9. The wall mount adaptor of claim 6, further comprising a wall attachment piece removably mountable to said wire loop, said wall attachment pice having:

a base piece;

a top piece, removably attachable to a first face of said base piece; and a suction piece, removably attachable to a second face of said base piece;

wherein said first face and said second face are opposite each other;

wherein a thickness of said base piece, when removably attached to said suction piece, is substantially equal to or greater than a distance from said middle plane to a point on any of said back crossbars of said plurality of back crossbars that is farthest from said middle plane.

10. The wall mount adaptor of claim 9 wherein said wall attachment piece further comprises an outer circular protrusion with a hollow center on said first face thereof, said outer circular protrusion having portals cut therein;

said wire loop extending through each of said portals of said outer circular protrusion.

11. The wall mount adaptor of claim 10, wherein one of said portals of said outer circular protrusion is adapted for placement of a flange on said wall attachment piece which is perpendicular to each of said front crossbars.

12. A method of using the wall mount adaptor of claim 10, comprising steps of:

removably attaching said suction piece to said second face of said base piece;

removably attaching said base piece to a substantially vertical surface;

removably placing a portion of said top side of said wire loop within said portals of said first face of base piece; and removably attaching said top piece to said first face of base piece such that said wire loop is between said base piece and said top piece;

wherein said connection between said base piece and said top piece around said wire loop is sufficient to hold said wire loop substantially immobile against a normal force due to gravity.

13. A method of using the wall mount adaptor of claim 6, comprising steps of:

placing an angled bend of a first shelf of a plurality of shelves on a front crossbar of said plurality of front crossbars such that a back sheet of said first shelf passes behind said front crossbar and in front of a back crossbar corresponding there-to; and rotating said first shelf such that said back sheet is substantially held in place from above by said back crossbar and said front sheet is at substantially a 45 degree angle relative to said middle plane.

14. A method of using the wall mount adaptor of claim 6, comprising steps of:

rotating a first shelf that is placed on a front crossbar of said plurality of front crossbars about said front crossbar such that a back sheet of said first shelf is between said front crossbar and a corresponding back crossbar and is spaced-apart from said back crossbar; and removing said shelf from said wire loop.

* * * * *